(12) United States Patent
Lelkes et al.

(10) Patent No.: US 10,967,248 B2
(45) Date of Patent: Apr. 6, 2021

(54) CROSSWORD PUZZLE GENERATOR

(71) Applicant: Google LLC, Mountain View, CA (US)

(72) Inventors: Adam Lelkes, New York, NY (US);
Colin Keogh, Boston, MA (US); Regis McHugh Gaughan, III, Somerville, MA (US); Katrina Tempero, Pleasanton, CA (US); Cong Yu, New York, NY (US); Vinh Quoc Tran, New York, NY (US); Ziad Raymond Sultan, Boston, MA (US)

(73) Assignee: Google LLC, Mountain View, CA (US)

( * ) Notice: Subject to any disclaimer, the term of this patent is extended or adjusted under 35 U.S.C. 154(b) by 170 days.

(21) Appl. No.: 16/439,206

(22) Filed: Jun. 12, 2019

(65) Prior Publication Data
US 2020/0391101 A1   Dec. 17, 2020

(51) Int. Cl.
*A63F 9/24*   (2006.01)
*A63F 3/04*   (2006.01)

(52) U.S. Cl.
CPC .......... *A63F 3/0423* (2013.01); *A63F 3/0421* (2013.01); *A63F 2003/0428* (2013.01)

(58) Field of Classification Search
CPC .................. A63F 3/0423; A63F 3/0421; A63F 2003/0428
See application file for complete search history.

(56) References Cited

U.S. PATENT DOCUMENTS

| | | | |
|---|---|---|---|
| 5,667,438 A * | 9/1997 | Rehm | A63F 3/0421 463/9 |
| 9,449,526 B1 * | 9/2016 | Tseng | G06F 16/338 |
| 2004/0162126 A1 * | 8/2004 | Rehm | G09B 3/04 463/9 |
| 2007/0136651 A1 * | 6/2007 | Probst | G11B 27/034 715/234 |

(Continued)

OTHER PUBLICATIONS

D. Bonomo, A. P. Lauf and R. Yampolskiy, "A crossword puzzle generator using genetic algorithms with Wisdom of Artificial Crowds," 2015 Computer Games: AI, Animation, Mobile, Multimedia, Educational and Serious Games (CGAMES), Louisville, KY, 2015, pp. 44-49. (Year: 2015).*

(Continued)

*Primary Examiner* — Dmitry Suhol
*Assistant Examiner* — Carl V Larsen
(74) *Attorney, Agent, or Firm* — Fish & Richardson P.C.

(57) ABSTRACT

Methods and systems that facilitate generating and presenting a crossword puzzle. Methods include obtaining, from a content source, a plurality of data items. Using the plurality of data items, a dictionary of clue-word pairs are generated. A crossword layout is generated using a random crossword layout generator. The generated crossword layout is input to a model that outputs a likelihood that the input crossword layout results in a valid crossword. If the likelihood that the crossword layout results in a valid crossword puzzle satisfies a first threshold, a plurality of words in a set of clue-word pairs from among the plurality of clue-word pairs is inserted (Continued)

into the crossword layout. If the plurality of words inserted into the crossword layout results in a valid crossword puzzle, the crossword puzzle is provided to a user on a user device using the set of clue-word pairs.

27 Claims, 9 Drawing Sheets

(56) References Cited

U.S. PATENT DOCUMENTS

2010/0210358 A1\* 8/2010 Csurka .................. A63F 13/655
463/31

OTHER PUBLICATIONS

B. De Kegel and M. Haahr, "Procedural Puzzle Generation: A Survey," in IEEE Transactions on Games, vol. 12, No. 1, pp. 21-40, Mar. 2020. (Year: 2020).\*
B. Ranaivo-Malançon, T. Lim, J. Minoi and A. J. R. Jupit, "Automatic generation of fill-in clues and answers from raw texts for crosswords," 2013 8th International Conference on Information Technology in Asia (CITA), Kota Samarahan, 2013, pp. 1-5. (Year: 2013).\*
Beacham et al, "Constraint Programming Lessons Learned from Crossword Puzzles," E. Stroulia and S. Matwin (Eds.): AI 2001, LNAI 2056, pp. 78-87, May 2001 © Springer-Verlag Berlin Heidelberg 2001.
Berghel [online], "Crossword Compilation with Horn Clauses", Nov. 1985, [retrieved Jun. 11, 2019], retrieved from: URL <https://academic.oup.com/comjnl/article-abstract/30/2/183/404335>, 6 pages.
Ginsberg et al [online], "Search Lessons Learned from Crossword Puzzles", 1990, [retrieved: Jun. 11, 2019] retrieved from: URL <https://pdfs.semanticscholar.org/1de1/b304d476488a4de29bedadd40364904c7637.pdf>, 6 pages.
J. M. Wilson, "Crossword Compilation Using Integer Programming", The Computer Journal 32(3), Jun. 1989, 3 pages.
Rigutini et al, "A Fully Automatic Crossword Generator", International Conference on Machine Learning and Applications, Dec. 2008, 6 pages.
crossdown.com [online], "How to Conduct a Professional Crossword Puzzle," unknown puc date [retrieved: Jun. 12, 2019], retrieved from: URL <http://www.crossdown.com/howtomake.htm>, 3 pages.
Scacco, "The influence of online quizzes on the acquisition of public affairs knowledge", Journal of Information Technology & Politics 13(4), Sep. 2016, unknown page count.

\* cited by examiner

400

| Top Stories | World | U.S. | Sports |

BigTech Co Tries to Avoid Social
Net's Mistake With 2018 Midterms

NetRide grated short-term license
to operate in London

Supreme Court upholds President's
Executive Order on Immigration

402 — Current News Crossword

Immigration, Bachelorette,
North Korea and More

Monday, June 25

More News

FIG. 4

CROSSWORD PUZZLE GENERATOR

BACKGROUND

This specification relates to methods and systems that relates to generating and providing crossword puzzles.

A crossword puzzle is a game in which a user answers a set of clues and fills in these answers (which may be one or more words) into a square or rectangular grid layout generally made up of white and non-white (e.g., black, blue, etc.) boxes.

SUMMARY

In general, one innovative aspect of the subject matter described in this specification can be embodied in methods that can include the operations of obtaining, by a data processing apparatus and from a content source, a plurality of data items; generating, by the data processing apparatus and using the plurality of data items, a dictionary comprising a plurality of clue-word pairs; generating a crossword layout using a random crossword layout generator; inputting the crossword layout into a model that outputs a likelihood that an input crossword layout results in a valid crossword, wherein the model is trained using a set of training data of historical crossword layouts that have resulted in valid and invalid crossword puzzles; in response to inputting the crossword layout into the model, obtaining, from the model, a likelihood that the crossword layout results in a valid crossword puzzle; determining that the likelihood that the crossword layout results in a valid crossword puzzle satisfies a first threshold; in response to determining that the likelihood satisfies the first threshold: inserting, into the crossword layout, a plurality of words in a set of clue-word pairs from among the plurality of clue-word pairs; determining that the plurality of words inserted into the crossword layout results in a valid crossword puzzle; and providing the crossword puzzle using the set of clue-word pairs to a user on a user device. Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

The plurality of data items is a plurality of news data items, and each news data item in the plurality of news data items relates to a news event.

Methods can include the operations of generating, by the data processing apparatus, an interest profile based on a threshold number of users with an interest in a category of news events; and wherein providing the crossword puzzle using the set of clue-word pairs to a user on a user device, includes providing the crossword puzzle to a user with a user profile that matches the interest profile.

Methods can include the operations of assigning a score to each clue-word pair in the dictionary based on the interest profile; determining a total score for the crossword puzzle based on the score assigned based on the interest profile to each clue-word pair in the set of clue-word pairs; and wherein providing the crossword puzzle using the set of clue-word pairs to a user on a user device, further includes providing the crossword puzzle to a user only if the total score satisfies a second threshold.

Providing the crossword puzzle using the set of clue-word pairs to a user on a user device can include the operations of providing a hint to the user for each clue-word pair used in the crossword puzzle, wherein the hint is a resource that the user can select to access the news data item on which the clue-word pair is based.

The user profile can be based on categories of news data items that the user has accessed.

Methods can include the operations of providing the user an interface where the user can select a crossword puzzle from among one or more crossword puzzles.

Methods can include storing a completion state for each of the one or more crossword puzzles; and providing, on the interface, the completion state for each of the one or more crossword puzzles.

Methods can include receiving a user's selection of a crossword puzzle from among the one or more crossword puzzles; and providing the selected crossword puzzle to the user using the stored completion state for the crossword puzzle.

Particular embodiments of the subject matter described in this specification can be implemented to realize one or more of the following advantages. The innovations described in this specification generate crossword puzzles in a resource efficient manner. Conventionally, crossword puzzle generators compiled crosswords by generating a crossword layout and then inserting multiple words from among clue-word pairs into the crossword layout until a valid crossword puzzle (as described below) was generated. This approach is resource intensive because the crossword puzzle generator has to identify and insert words into the layout within the constraints imposed by the layout (e.g., length of word limits, intersection of words) as well as the constraints imposed by already-inserted words (e.g., one or more letters of an inserted word may need to be used in other word/s to be inserted). Moreover, in some scenarios, the crossword puzzle generators may conclude that the crossword layout will not result in a valid crossword puzzle, in which case, the conventional crossword puzzle generators repeat the crossword compilation process with another crossword layout. In contrast, the innovations described in this specification saves a significant amount of computing resources by performing the resource-intensive crossword compilation process only for crossword layouts that have a high likelihood of generating a valid crossword puzzle. The crossword puzzle generator, as described in this specification, generates crossword layouts and then uses a model to identify the likelihood that these layouts will result in valid crossword puzzles. The crossword puzzle generator, as described in this specification, then attempts to compile a crossword puzzle only for those crossword layouts that have a high likelihood of resulting in a valid crossword puzzle.

The innovations described in this specification can also increase user engagement on a content platform by providing content tailored to the users' interests in a more engaging game format. Conventional crossword puzzles may use content from any range of categories. In contrast, the innovations described in this specification generate crossword puzzles using content that matches the categories of news events (e.g., politics, technology) in which the user is interested. The content platform then provides this tailored content to users in a crossword puzzle game format, which is an interactive format in which the user can test his/her knowledge of the events underlying the different clues of the puzzle.

Relatedly, the innovations described in this specification further increase user engagement on the content platform by providing hints for the crossword puzzle's clues that direct users to other content on the content platform. Conventional crossword puzzles only provide answers to the clues that the user can use to validate whether the word inserted in the puzzle is correct. In contrast, the innovations described in this specification provide hints for each of the crossword puzzle's clues. If a user does not know or is unsure about the answer to a clue, the user can select a hint, which then directs users to other content on the content platform that the user can access to answer the clue. The hints motivate users to keep trying to solve a clue instead of simply consulting the answer to the clue. As a result, users may access more content on the content platform presented in the form of hints to the user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 depicts an example user interface from which a user can access a crossword puzzle.

Like reference numbers and designations in the various drawings indicate like elements.

DETAILED DESCRIPTION

Figure 1:
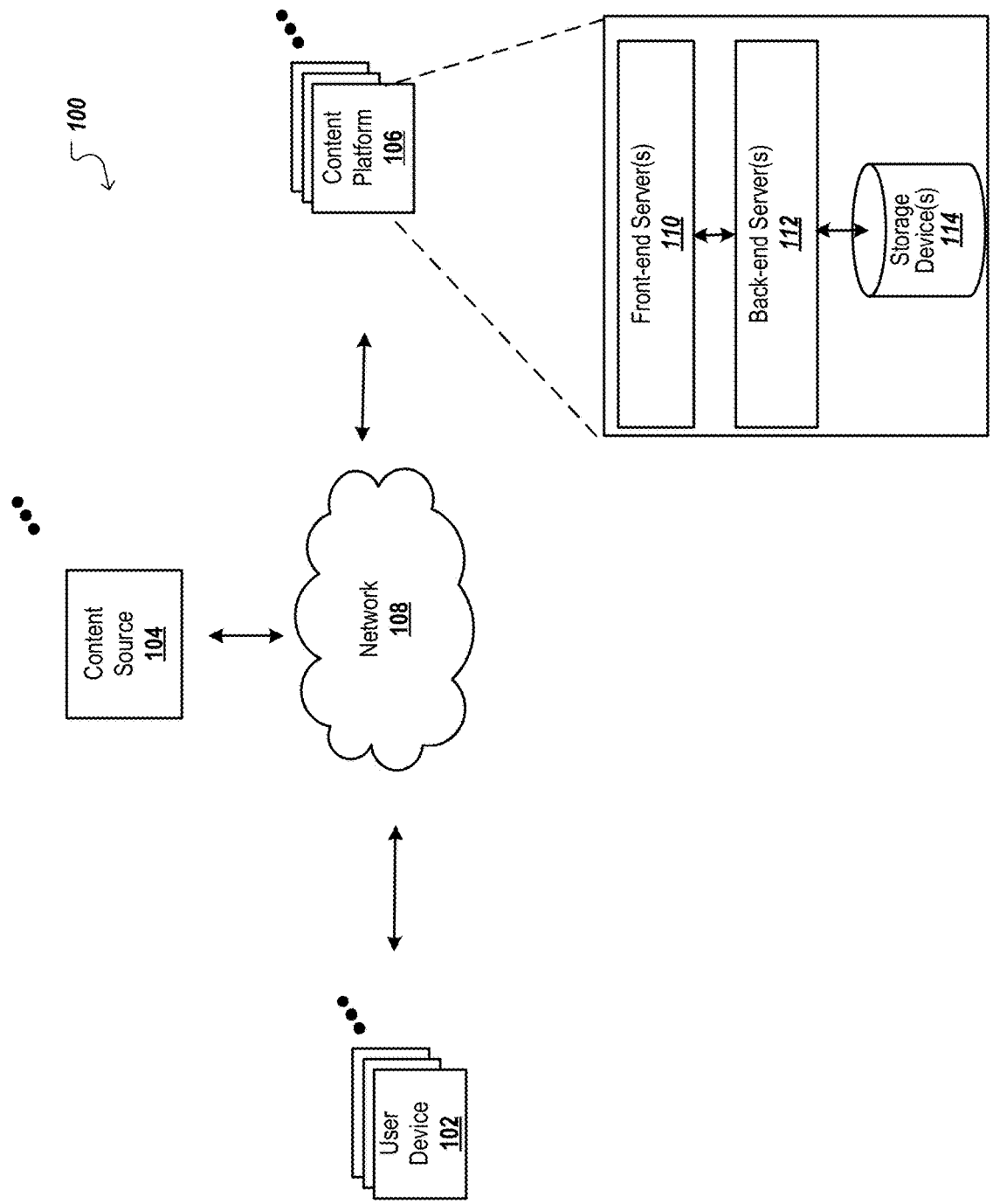
FIG. 1 is a block diagram of an example environment in which content is distributed for presentation.

This disclosure generally relates to computer-implemented methods and systems that generate crossword puzzles.

A crossword puzzle generator, as described below and in detail throughout this specification, performs the following four operations in generating crossword puzzles. First, the crossword puzzle generator generates a dictionary of clue-word pairs using data items (e.g., news articles, videos, recordings, radio broadcasts, etc.). The crossword puzzle generator can obtain the data items from different content sources (e.g., news platforms, social media platforms, data aggregator platforms, and/or other content sharing sources). Using the content within these data items (e.g., sentences, titles, headings, figures, illustrations, tables, etc.), the crossword puzzle generator generates a dictionary of clue-word pairs that can be used in generating a crossword puzzle. As used in this specification, a clue is a phrase or sentence based on content within a data item that omits or obscures one or more words of the phrase or the sentence, or is a phrase or sentence provides a clue for another word. In the case of the former, the omitted or obscured word(s) of a clue make up the "word" in the clue-word pair. An example clue-word pair is "_____ is increasing tariffs on Chinese goods"-"Donald Trump." In this example, the clue is "_____ is increasing tariffs on Chinese goods" and the corresponding word is "Donald Trump." In the case of the latter, the clue describes or otherwise provides a hint for a missing word. Here an example clue is "Neil Armstrong took a giant leap for them," and the answer is "Mankind."

The "word" as used in the context of a clue word pair may be one or more words. For example, if the answer for the crossword is Usain Bolt, which is two words, the "word" of the clue word pair may be "UsainBolt." The term "word" is typically used because the crossword does not include spaces in the answer boxes.

Second, the crossword puzzle generator generates a crossword layout using, for example, a random crossword layout generator. The crossword puzzle generator can specify the dimensions of a square or rectangular crossword layout grid (e.g., 16×16, 8×8), which the random crossword layout generator uses to generate a crossword layout made up of a combination of white/lightly shaded boxes and non-white/darkly-shaded boxes.

Third, the crossword puzzle generator evaluates whether the generated crossword layout has a likelihood of resulting in a valid crossword. As used in this specification, a valid crossword puzzle is a crossword layout into which words from a set of clue-word pairs can be inserted within the constraints imposed by the layout (e.g., length of word limits, intersection of white boxes (i.e., letters of words), direction of the words). To evaluate whether the generated crossword layout has a likelihood of resulting in a valid crossword, the crossword puzzle generator inputs the crossword layout into a model that determines the likelihood that an input crossword layout is a valid crossword puzzle. The model may be a supervised or unsupervised machine learning model that is trained using a set of training data of historical crossword layouts that have resulted in valid crossword puzzles. Based on the crossword layout input into this model, the model determines a likelihood that the input crossword layout results in a valid crossword puzzle.

Finally, if the likelihood that the crossword layout satisfies (e.g., meets or exceeds) a first threshold (e.g., 90%), the crossword puzzle generator determines whether the crossword layout actually results in a valid crossword puzzle. The crossword puzzle generator uses one or more sets of clue-words pairs from the dictionary to determine whether a valid crossword can be generated using the words in these pairs. Specifically, for each set of clue-word pairs, the crossword puzzle generator inserts words from these clue-word pairs into the crossword layout and determines whether the inserted words result in a valid crossword puzzle. If it does, the crossword puzzle generator stores this crossword puzzle along with the clues-word pairs, in a storage device where other generated crossword puzzles are also stored. Subsequently, if a user selects to play a particular crossword puzzle, the crossword puzzle generator provides that crossword puzzle to the user.

These features and additional features are described in more detail below with reference to FIGS. 1-9.

FIG. 1 is a block diagram of an example environment 100 in which content is distributed for presentation. The example environment 100 includes a network 108, such as a local area network (LAN), a wide area network (WAN), the Internet, or a combination thereof. The network 108 connects user devices 102, content platforms 106, and content sources 104. The example environment 100 may include many different user devices 102, content platforms 106, and content sources 104.

A user device 102 is an electronic device that is capable of requesting and receiving content over the network 108.

Example user devices 102 include personal computers, mobile communication devices, digital assistant devices, and other devices that can send and receive data over the network 108. A user device 102 typically includes a user application, such as a web browser, to facilitate the sending and receiving of data over the network 104, but native applications executed by the user device 102 can also facilitate the sending and receiving of content over the network 108. Examples of content presented at a user device 102 include webpages, word processing documents, portable document format (PDF) documents, images, videos, and search results pages.

A content platform 106 is a computing platform that enables distribution of content. Example content platforms 106 include search engines, social media platforms, news platforms, and data aggregator platforms. Each content platform 106 may be operated by a content platform service provider.

A user using an application (e.g., a web browser or native application) on a user device 102 can access and retrieve content presented on a content platform 106. The content platform 106 may publish and make available on the platform, its own content. For example, the content platform 106 may be a news platform, which publishes its own news articles. In such a scenario, the content platform 106 includes one or more content sources 104, from which the content platform 106 retrieves content. The content platform 106 can also present content provided by one or more content sources 104 that are separate from the content platform 106. In the above example, the news platform can also present content created by different authors and provided by one or more content sources 104 (that are separate from the content platform 106). As another example, the content platform 106 may be a data aggregator platform that does not publish any of its own content, but aggregates and present news articles provided by different news websites (i.e., content sources 104).

As shown in FIG. 1, the content platform 106 includes one or more front-end servers 110, one or more back-end servers 112, and one or more storage devices 114. The front-end servers 110 can transmit data to, and receive data from, user devices 102 over the network 108. For example, the front-end servers 110 can provide, to an application executing on a user client device 102, interfaces and/or data for presentation with the interfaces. The front-end servers 110 can also receive data specifying user interactions with the interfaces of the application (as further described below). The front-end servers 110 can update the interfaces, provide new interfaces, and/or update the data presented by the interfaces based on user interactions with the application. Example interfaces provided by the front-end servers 110 are shown in FIGS. 4-8 (which are further described below).

The front-end servers 110 can also communicate with the back-end servers 112. For example, the front-end servers 110 can identify data to be processed by the back-end servers 112 (e.g., data specifying the crossword puzzle to be provided to the user, data specifying user's interests) and provides the identified data to the back-end servers 112. The back-end servers 112 can obtain the necessary data (e.g., data for the crossword puzzle requested by the front-end server 110) from one or more storage devices 114. A storage device 114 can include one or more databases (or other appropriate data storage structures) stored in one or more non-transitory data storage media (e.g., hard drive(s), flash memory, etc.). The back-end servers 112 can then send to the front-end servers 110, data for a particular user and transmit the data to the user device 102 of the particular user over the network 108. The back-end servers 112 can include different components or engines, some of which are described below with reference to FIGS. 2 and 3. As used herein, the term engine or component refers to a data processing apparatus, which can include hardware as well as software executing on hardware, that performs a set of tasks.

Figure 2:
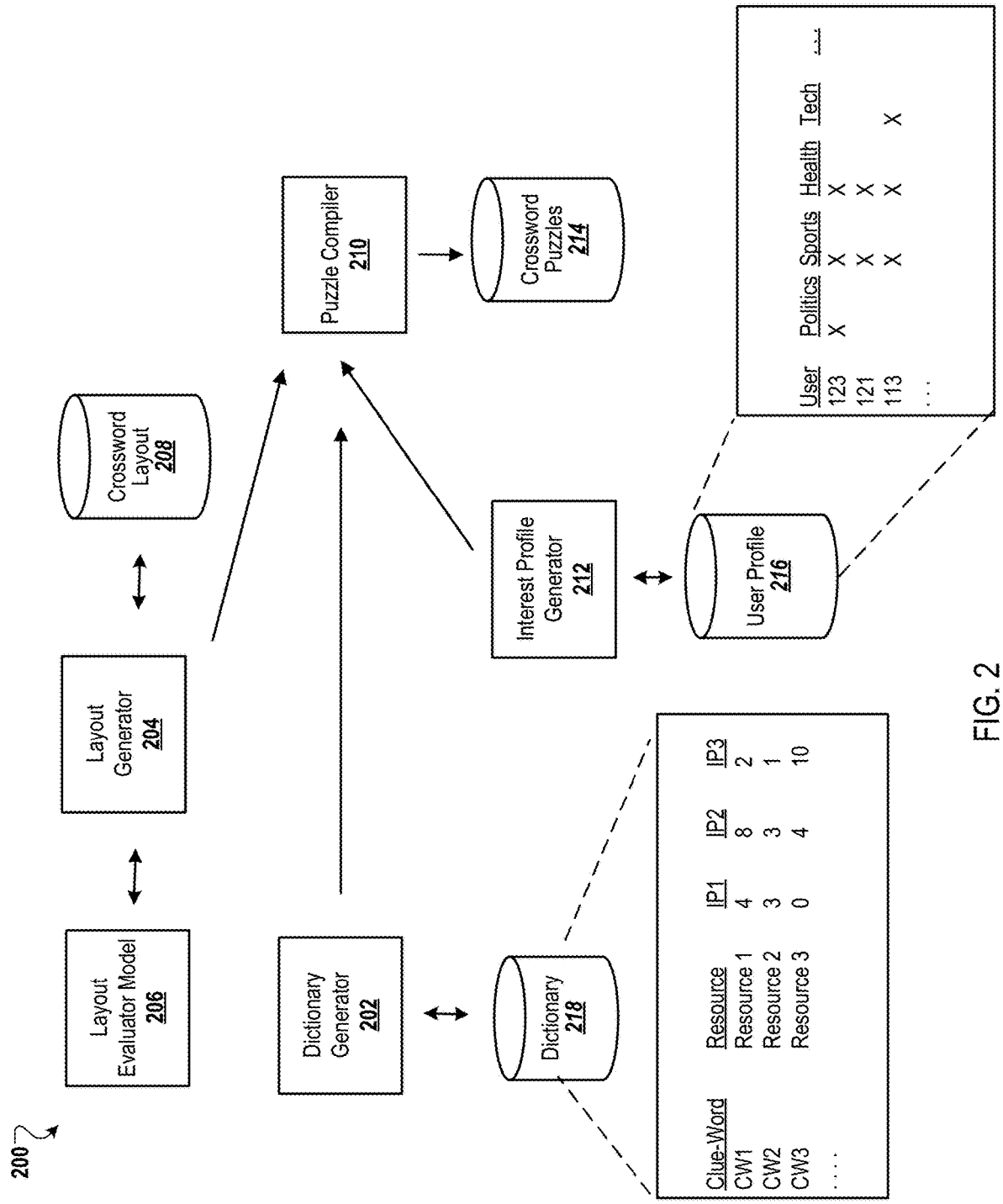
FIG. 2 is a block diagram depicting the components of the content platform that generate crossword puzzles.

FIG. 2 is a block diagram depicting the components of the content platform 106 that generates crossword puzzles. For ease of reference, the components shown in FIG. 2 (and described below) will collectively be referred to as a crossword puzzle generator.

As shown in FIG. 2, the crossword puzzle generator includes the following engines, which are implemented within the back-end server 112 of the content platform 106: a layout generator 204, a layout evaluator model 206, a dictionary generator 202, an interest profile generator 212, and a puzzle compiler 210. The content platform 106 also includes the following data storage devices 114: a dictionary storage 218, a crossword layout storage 208, a user profile storage 216, and a crossword puzzles storage 214. The tasks performed by each of these engines and the data stored, retrieved, and maintained within each of these storage devices is described below with reference to FIG. 3. Although FIG. 2 shows a certain example architecture, other implementations may include a fewer number of engines, which may be configured to perform the operations described below. Alternatively, some implementations may include more engines than shown in FIG. 2 to perform the operations described below.

Figure 3:
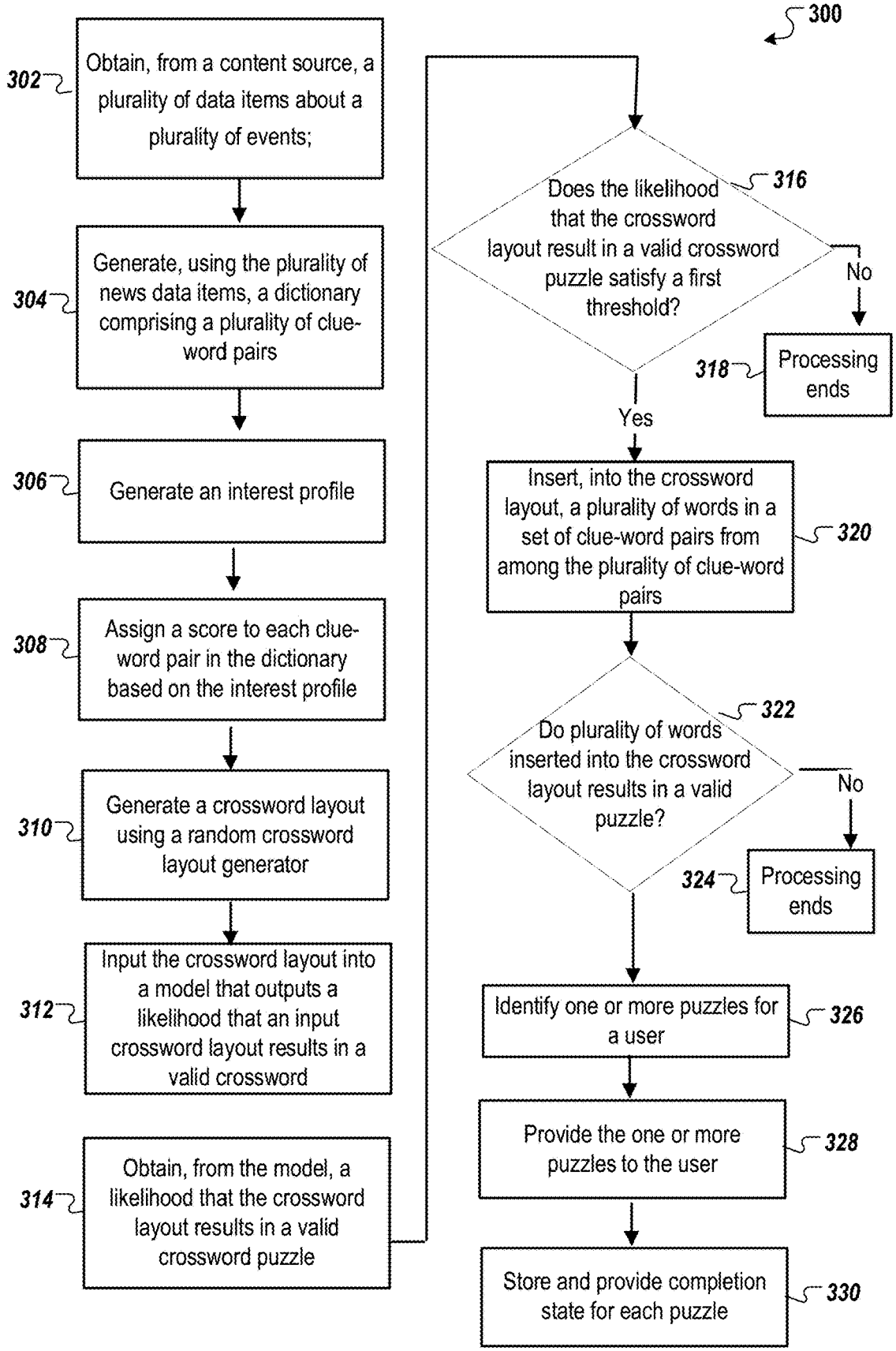
FIG. 3 is a flow diagram of an example process for generating crossword puzzles.

FIG. 3 is a flow diagram of an example process 300 for generating crossword puzzles. Operations of the process 300 are described below as being performed by the components of the crossword puzzle generator that are depicted in FIG. 2. The operations of the process 300 are described below for purposes of illustration only. The operations of the process 300 can be performed by any appropriate device or system, e.g., any appropriate data processing apparatus. Operations of the process 300 can also be implemented as instructions stored on a non-transitory computer readable medium. Execution of the instructions cause one or more data processing apparatus to perform operations of the process 300.

The dictionary generator 202 obtains, from a content source 104, a plurality of data items (at 302). In some implementations, the dictionary generator 202 can include a web crawler or scraper that routinely (i.e., on regular time intervals) crawls different content sources 104 to collect data items from one or more of these content sources 104. These data items can include news data items, which are media items (e.g., articles, videos) about news events, sports data items, or data items of other different categories. The crawler/scraper can obtain such news data items from one or more content sources 104 that store these data items (e.g., news websites, sports websites, and so on). In some implementations, the dictionary generator 202 can retrieve content previously displayed on the content platform 106, which, for example, may be stored in an archive storage device of the content platform 106.

The dictionary generator 202 generates, using the plurality of data items, a dictionary comprising a plurality of clue-word pairs (at 304). For example, as described below, the dictionary generator 202 accomplishes this by (1) identifying text within the data items that forms the basis for a clue in a clue-word pair, (2) determining one or more words to omit from the identified text, (3) replacing these words from the identified text with a blank space (which is generally indicated by a line, such as "_____"), and (4) storing the clue-word pair in a dictionary storage device 218.

The dictionary generator 202 first identifies the text, which forms the basis for a clue in a clue-word pair. In some implementations, the dictionary generator 202 can identify sentences, phrases, or other text within the data item. For example, the dictionary generator 202 can identify text from titles, headings, and/or subheadings within the data item. In some implementations, the dictionary generator 202 uses the structure of webpage to identify the titles, headings, and subheadings within the data items. The dictionary generator 202 can identify text associated with images, videos, figures, or other graphics in the data item. In some implementations, the dictionary generator 202 can use the structure (e.g., image tags, table tags) to find images, figures, or other graphics in the page and then extracts the text associated with these graphics (e.g., by parsing the caption or subtitle tags associated with these images, figure, or graphics).

In some implementations, the dictionary generator 202 can include a model, which can be implemented as a rules-based engine or a machine learning model, that uses (all or a portion of) the text within a data item to generate one or more sentences that summarize the text in the data item. An example of such a model is a conventional natural language processing (NLP) model, which is trained using a set of data items and summaries of these data items, to generate a one-to-two sentence summary of the text within a data item.

The dictionary generator 202 then determines one or more words that can be omitted from the text to form the clue. In some implementations, the dictionary generator 202 can apply a set of rules to identify words that can be omitted from each identified text. For example, the dictionary generator 202 can include rules that identify and omit entity names from the identified text. As used in this specification, an entity name is a name or noun associated with a person, location, or object. Example entity names include Donald Trump, New York, ice cream, Statute of Liberty, and dragon. In such implementations, the dictionary generator 202 can store a list of known entity names in a data storage device, which it can search for within the identified text. Accordingly, the dictionary generator 202 searches for and finds a match for an entity name within the identified text from among the list of known entities. In some implementations, the dictionary generator 202 can include rules to identify proper nouns within the identified text by searching for one or more words (other than the first word or two) in the sentence that have their first letter in upper case (e.g., "The world's fastest runner is Usain Bolt."). In some implementations, the dictionary generator 202 can include a machine learning model, such as a natural language processing model that is trained using a set of training data item (e.g., articles, blogs, or other text) to identify entities within the identified text.

In some implementations, the dictionary generator 202 can include rules that identify unique or rare words within the identified text. For example, the dictionary generator 202 can include an index of words for the retrieved data items (retrieved in operation 302). The dictionary generator 202 can add, for example, a "rare" tag to words in the index that appear in the retrieved data items with lower frequency (e.g., less than a threshold number of times). The dictionary generator 202 then searches for and identifies the rare words (identified with the "rare tag" in the index) within the identified text. In some implementations, the above-described natural language processing model can be used to build a knowledge base of common words as well as rare or unique words within text of data items. The dictionary generator 202 then searches for and identifies the rare words in the knowledge base within the identified text.

In some implementations, the dictionary generator 202 may use a semantic rule set or machine learned techniques to generate a clue for another word. For example, for the sentence "The world's fastest runner is Usain Bolt," the verb "is" followed by the proper noun "Usain Bolt" indicate a definitional sentence. The ruleset may define that text preceding the verb "is" is taken as a clue for the proper noun. Accordingly, the clue may be "The world's fastest runner," and the word may be "usainbolt," or "bolt," or "usain."

In some implementations, the dictionary generator 202 can use a model to evaluate the difficulty level for answering the clue. In such implementations, the dictionary generator 202 can omit one or more words from the identified text using any of the techniques described above. Alternatively, the dictionary generator 202 can omit one or more words at random. The dictionary generator 202 then uses a machine learning model that predicts the one or more words that are omitted from the identified text. The machine learning model can be a supervised or unsupervised machine learning model that is trained using clue-word pairs as well as the content for the data items that forms the basis for each clue-word pair. The model may be routinely (e.g., daily, weekly) trained with new clue-word pairs and the corresponding data items. The trained model then uses the input clue to determine the corresponding word(s) as well as a confidence value that indicates the model's confidence that the one or more predicted words is correct. For example, the machine learning model may determine that the predicted words have a 92% change of being correct. The dictionary generator 202 can ignore clue-word pairs for which the model returns high confidence values, which likely indicates that the clue-word pair is trivial. Similarly, the dictionary generator 202 can ignore clue-word pairs for which the model returns high confidence values, which likely indicates that the clue-word pair is too difficult. For example, the machine learning model may predict with a 99% confidence that, for a clue "Wall street is in New _____" the word is "New." As another example, the machine learning model may predict with a 60% confidence that, for a clue "_____ is an English rock band formed in London," the word is "Led Zeppelin." In some implementations, the dictionary generator 202 can be configured to only store clue-word pairs with confidence values that are within a specified range of confidence values (e.g., 40-90%).

Upon determining the one or more words to omit from the identified text, the dictionary generator 202 replaces this word (or these words) with a blank space or an underline (e.g., "_____"). The identified text with the omitted words is the clue, and the omitted words make up the "word" in the clue-word pair. The dictionary generator 202 then stores this clue-word pair in a dictionary storage device 218. In some implementations, and as shown in FIG. 2, the dictionary generator 202 can store, along with each clue-word pairs, one or more links (or other resource identifier) to the data item that forms the basis for (or is otherwise related to) the clue-word pair. For example, the dictionary generator 202 can include a uniform resource locator (URL) to the data item, which includes the sentence/phrase that is used in the clue. As another example, the dictionary generator 202 can include one or more URLs to data items that are relevant to the clue. If the clue relates to Donald Trump's increase on tariffs against China, the related resources may include links to news articles describing negotiations between China and USA regarding the tariffs. The dictionary generator 202 can search for and identify these relevant articles using the sentence/phrase making up the clue-word pair.

The interest profile generator 212 generates an interest profile based on a threshold number of users with an interest in one or more categories of content, e.g., news events (at 306). The categories of news events (e.g., world politics, technology startup, healthcare, etc.) in which a user may be interested are stored in a user profile storage device 216, as shown in FIG. 2. In some implementations, users of a content platform 106 can expressly indicate the categories of news in which they are interested. Alternatively, the interest profile generator 212 can determine the category from the dominant intent of the terms of the content. The content platform 106 then stores, in the user profile storage device 216, these categories of news events along with a unique identifier for the user (as shown in FIG. 2). For brevity, the categories of news events that are stored for a user in a user profile storage device 216 are also referred to in this specification as a user profile. FIG. 2 shows an example of user profiles for different users that are stored in the user profile storage device 216. For example, the user may specify that he/she is interested in politics, sports, and health, each of which is stored in the user's user profile in the user profile storage device 216 (as shown for user 123 in FIG. 2). In some implementations, the content platform 106 can update (or add to) a stored user profile with the categories of news events corresponding to news data items that the user has accessed. For example, if a user reads an article about Technology startup, the content platform 106 can store a "technology" category along with the user's profile in the user profile data storage device 216.

Using the user profile data stored in the user profile storage device 216, the interest profile generator 212 determines a threshold number of users that have an interest in a category of news events. In some implementation, the interest profile generator 212 uses the stored user profiles to determine a count of users interested in a category of news events. For example, based on the stored user profiles, the interest profile generator 212 can use a counter to compute an aggregate (i.e., a sum) of users interested in a particular news category (e.g., "Health). In some implementations, the interest profile generator 212 uses the user profile data to determine a count of users who are interested in the same two or more categories of news events. For example, the interest profile generator 212 can compute an aggregate (i.e., a sum) of users interested in the same two categories (e.g., Sports and Health).

If the aggregate number of users interested in one or more categories satisfies (e.g., meets or exceeds) a threshold, the interest profile generator 212 generates an interest profile for that category (or categories). For example, if the threshold is 400 and the aggregate number of users (as determined using the stored user profile data) interested in both Sports and Health categories satisfies that threshold, the interest profile generator 212 can generate a "Sports-Health" interest profile. The interest profile generator 212 can store the generated interest profiles in a separate data structure within the user profile data storage device 216. Alternatively, the interest profiles generated by the interest profile generator 212 can be stored in a data storage device separate from the user profile storage device 216.

The dictionary generator 202 assigns a score to each clue-word pair in the dictionary (as stored in the dictionary storage device 218) based on the interest profiles (at 308). In some implementations, the dictionary generator 202 determines the category(ies) for the data item corresponding to a clue-word pair is assigned. In some implementations, the content platform 106 can identify categories for a data item based on, for example, the page structure, the content within the page, and/or the internal categorical organization of content on the content platform 106. For example, the content platform 106 can organize content on the platform in various categories and/or sub-categories. The content platform 106 can then access the categories and/or sub-categories that are assigned to the data item. As another example, the content platform 106 can parse the content of the page to identify entities (as described above) that are associated with particular categories (e.g., in a separate data structure). In this example, the dictionary generator 202 can parse the data item that includes the text "Usain Bolt is the world's fastest runner" to identify "Usain Bolt" as the entity, which is associated with a Sports category.

Using the identified category/categories for the data item, the dictionary generator 202 can search for interest profiles that include (e.g., in the name or other identifying data about the interest profile) one or more of these categories. Depending on the number of matching categories between the categories assigned to a data item and categories included in an interest profile, the dictionary generator 202 can assign a score to the clue-word pair for each interest profile. In some implementations, rules can be defined that directly correlate the score with the number of matching categories. For example, if the interest profile includes all the categories that are also assigned to the data item, the dictionary generator may assign a maximum score, e.g., 10, to the clue-word pair for that interest profile. On the other hand, if the interest profile only includes a subset (e.g., two of three) of the categories that are assigned to the data item, the dictionary generator 202 may assign a lower score that can be proportional to the number of matching categories (e.g., $2/3*10=6.7$). In this way, the dictionary generator 202 determines the interest-profile specific scores for each clue-word pair and then stores these scores along with the clue-word pairs in the dictionary (stored in the dictionary storage device 218). As shown in FIG. 2, the dictionary storage device 218 identifies the clue-word pairs (e.g., CW1, CW2) as well as their corresponding scores for each interest profile (e.g., IP1, IP2, IP3).

The layout generator 204 generates a crossword layout using, for example, a random crossword layout generator (at 310). In some implementations, the layout generator 204 can specify certain parameters for the crossword layout, e.g., the shape of the layout grid (e.g., square, rectangle, or other), the dimensions of the crossword layout grid (e.g., 10×10, 8×8, 10×14), and the number of possible words that need to be inserted into the layout (e.g., 16, 20, etc.). Using these parameters, the random crossword layout generator generates a crossword layout made up of a combination of white/lightly shaded and non-white/dark shaded boxes. In some implementations, the layout generator 204 can generate multiple (e.g., 100s or 1000s) crossword layouts that it then analyzes using the model (as described below).

The layout generator 204 inputs the crossword layout (which is generated at operation 310) into a layout evaluator model 206 that outputs a likelihood that an input crossword layout results in a valid crossword (at 312). In some implementations, the layout evaluator model 206 can be a supervised or unsupervised machine learning model. For example, the layout evaluator model 206 can be trained using a set of training data, which includes crossword layouts that have been identified as resulting in valid crossword puzzles. The training data may include valid crossword puzzles that have been generated and stored in the crossword puzzles storage device 214 (as further described below). The layout evaluator model 206 outputs the likelihood that the input crossword layout results in a valid crossword puzzle.

In some implementations, the layout evaluator model 206 may include a separate model for each interest profile. In such implementations, the training data for each model is comprised of crossword layouts that have resulted in valid crossword puzzles that are associated with one or more interest profiles. The training data may be obtained from, e.g., crossword puzzles that are associated with particular interest profiles (as stored in the crossword puzzle storage device 214 and as further described below). Upon receiving the crossword layout(s) from the layout generator 204, the layout evaluator model 206 can insert the generated crossword layout(s) into each model. As a result, each of these models outputs the likelihood that the input crossword layout results in a valid crossword puzzle for the respective interest profile.

The layout generator 204 obtains, from the layout evaluator model 206, a likelihood that the input crossword layout results in a valid crossword puzzle (at 314). For each crossword layout input to the layout evaluator model 206, this model outputs a likelihood that the crossword layout results in a valid crossword puzzle. If multiple interest profile-specific models are used, each model outputs (and the layout generator 204 obtains) the likelihood that the input crossword layout(s) results in a valid crossword puzzle for the respective interest profile.

The layout generator 204 determines whether the likelihood output by the model(s) satisfies (e.g., meets or exceeds) a first threshold (at 316). For example, the content platform service provider may specify a threshold of 85%, in which case, a 92% likelihood output by the model satisfies this threshold of 85%. In some implementations, the content platform service provider may use a different threshold depending on the interest profile. Accordingly, the content platform service provider may use an 80% threshold for a "US-China Politics" interest profile, while using a 95% threshold for a "Basketball-Tennis" interest profile.

If the likelihood output by the model does not satisfy the first threshold, the layout generator 204 stops any further processing and discards all data relating to the crossword layout that does not satisfy the first threshold (at 318). On the other hand, if the likelihood output by the model satisfies the first threshold, the layout generator 204 stores the data relating to the crossword layout(s) that satisfies this threshold in the crossword layout storage device 208. If multiple interest-profile specific models were used, the layout generator 204 stores the crossword layout in the crossword layout storage device 208 along with an identification of the interest profile(s) corresponding to the layout.

The puzzle compiler 210 determines whether one of the stored crossword layouts results in a valid crossword puzzle. To accomplish this, the puzzle compiler 210 first obtains one or more stored crossword layouts from the crossword layout storage device 208.

For each retrieved crossword layout, the puzzle compiler 210 inserts, into the crossword layout, a plurality of words in a set of clue-word pairs from among the plurality of clue-word pairs (at 320). In some implementations, the puzzle generator obtains one or more sets of clue-word pairs from the dictionary. The puzzle compiler 210 can randomly select the sets of clue-word pairs. The puzzle compiler 210 then inserts the words from the clue-word pairs into the crossword layout within the constraints of the crossword layout (e.g., length of word limits imposed by the layout, direction (across, down) of the word, intersection of white boxes, maximum number of words allowed) as well as the constraints imposed by already-inserted words (e.g., one or more letters of an inserted word may need to be used in other word/s to be inserted). The puzzle compiler 210 can insert words into the crossword layout within the layout's constraints using conventional crossword compiling algorithms. For example, some conventional techniques represent the crossword compilation task as SAT problems or integer programs and uses various standard algorithms for solving such problems to compile the crossword. It will be appreciated that other crossword compilation approaches may be used as well.

For each set of words from clue-word pairs that are inserted into the crossword layout, the crossword puzzle compiler 210 determines whether the crossword layout results in a valid crossword (at 322). A valid crossword puzzle results when words from a set of clue-word pairs are inserted into all the white (or lightly shaded) boxes of the crossword layout within the constraints imposed by the layout and by the already-inserted words (as described above).

Alternatively, instead of randomly selecting clue-word pairs from the dictionary storage device 218, the puzzle compiler 210 can select clue-word pairs from the dictionary 218 based on the scores assigned to these clue-word pairs for each interest profile. In some implementations, the puzzle compiler 210 can query the crossword layout storage device 208 using the layout to identify the corresponding interest profile(s). Using the identified interest profile(s), the puzzle compiler 210 selects sets of clue-words pairs based on the scores that are assigned to these clue-word pairs (as shown in FIG. 2) for that interest profile (in the dictionary storage device 218). For example, if the selected crossword layout is associated with an IP1 interest profile, the puzzle compiler 210 can select clue-word pairs that have a non-zero score associated with that interest profile. In this example, the puzzle compiler 210 selects clue-word pairs CW1 and CW2, but not CW3, which has a zero score associated with interest profile IP1. Alternatively, the puzzle compiler 210 can select clue-word pairs associated with a particular interest profile only if the interest profile scores assigned to these clue-word pairs in the dictionary 218 satisfies (e.g., meets or exceeds) a threshold. For example, if the selected crossword layout is associated with an IP1 interest profile, the puzzle compiler 210 can select clue-word pairs that have a score greater than five, associated with that interest profile. After this score-based approach identifies one or more sets of clue word pairs, the puzzle compiler 210 inserts these clue-word pairs into the crossword layout to evaluate whether the crossword layout results in a valid crossword puzzle (in the same manner as described in the preceding paragraph).

If, based on the above operations, the puzzle compiler 210 determines that the crossword layout does not result in a valid crossword puzzle, the puzzle compiler 210 stops any further processing with respect to that layout (at 324). Alternatively, the puzzle compiler 210 can retrieve another crossword layout and begin performing the above operations with respect to that layout.

If the puzzle compiler 210 determines that the crossword layout results in a valid crossword puzzle, the puzzle compiler 210 stores this crossword layout along with the selected clue-word pairs in a crossword puzzles storage device 214. If the crossword layout and/or the selected clue-word pairs (as described above) were associated with a particular interest profile, the puzzle generator includes a tag (or another appropriate identifier) for this interest profile (in the crossword puzzles storage device 214) along with the stored puzzle. This interest profile tag indicates that the crossword puzzle is associated with the interest profile identified in the tag. It will be appreciated that, in some instances, the same crossword puzzle may be associated with multiple different interest profiles.

In some implementations, the puzzle compiler 210 can also generate an interest profile-specific total score for a generated crossword puzzle. The puzzle compiler 210 generates the total score by summing up the scores for an interest profile that are associated with each clue-word pair used in the crossword puzzle. A higher score indicates that the clue-word pairs are more aligned with the categories associated with the interest profile. Conversely, a lower score indicates that the clue-words are less aligned with the categories associated with the interest profile.

The puzzle compiler 210 identifies crossword puzzles for each user of the content platform 106 (at 326). The puzzle compiler 210 accomplishes this in four steps. First, the puzzle compiler 210 identifies categories of interest assigned to the user in the user profile storage device 216. In some implementations, the puzzle compiler 210 uses the user's unique identifier to identify the corresponding categories of interest stored for the user in the user profile storage device 216. Second, the puzzle generator uses these categories to identify interest profiles from among the interest profiles generated by the interest profile generator 212 (as described above). In some implementations, the puzzle compiler 210 uses the identified categories to search for and identify one or more interest profiles that include (in their name or other identifying information for the interest profile) one or more of these categories. Third, the puzzle compiler 210 uses the identified interest profiles to search for crossword puzzles that are associated with these interest profiles in the crossword puzzles storage device 214. In some implementations, the puzzle compiler 210 can select a subset of the identified crossword puzzles based on the total scores associated with the identified crossword puzzles in the crossword puzzle storage device 214. For example, the puzzle compiler 210 can select five crossword puzzles that have scores higher than the other identified crossword puzzles.

After the puzzle compiler 210 has identified crossword puzzles for a user, it provides these puzzles to the user (at 328). In some implementations, the user of a user of user device 102 can access crossword puzzles from an interface provided by the front-end server 110 of the content platform 106. An example of such an interface is shown in FIG. 4.

FIG. 4 depicts an example user interface from which a user can access a crossword puzzle. As shown in FIG. 4, the user can select (e.g., using a mouse, by touching) item 402, which is titled "Current News Crossword." Upon clicking the link for this title, the front-end server 110 requests from the puzzle compiler 210, data regarding the crossword puzzles identified for the user (as described above). In response, the puzzle compiler 210 provides the identified crossword puzzles to the front-end server 110, which in turn provides a list of these crossword puzzles to the user in an interface, such as the one shown in FIG. 5.

Figure 5:
FIG. 5 depicts an example interface that presents a list of the crossword puzzles selected for the user.

FIG. 5 depicts an example interface that presents a list of the crossword puzzles selected for the user. As shown in FIG. 5, the user is presented with five possible crossword puzzles that were identified by the puzzle compiler 210: 502, 504, 506, 508, and 510. Each of the five identified puzzles also lists the categories of the interest profiles associated with the crossword puzzle. For example, crossword puzzle 502 identifies three categories: Immigration, Bachelorette, and North Korea.

The user can select any of the crossword puzzles shown on the interface shown in FIG. 5. Upon selecting one of the crossword puzzles from the list of puzzles, the front-end servers 110 presents the user with another interface that includes the selected crossword puzzle along with the clues, as shown in FIG. 6.

Figure 6:
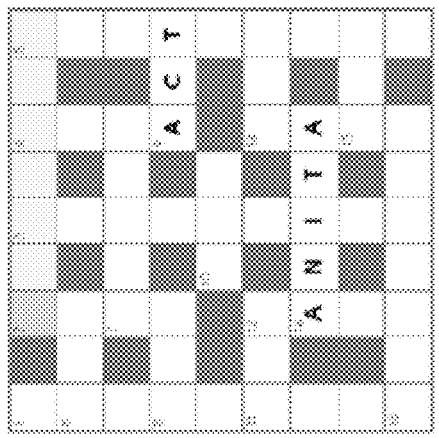
FIG. 6 depicts an example interface in which a user is presented with a crossword puzzle.

FIG. 6 depicts an example interface 600 in which a user is presented with the crossword puzzle. A crossword layout is presented on the left side of the interface 600, while the clues are presented on the right hand side. If the user desires to fill in the crossword layout, the user can select the "Fill Answers" link shown in FIG. 6. If the user desires to clear words that have already-been inserted into the puzzle, the user can select the "Clear Puzzle" link, which empties out the puzzle.

Upon selecting the "Fill Answers" link, the front-end server 110 presents another user interface that identifies a clue and the corresponding portion of the crossword puzzle where the user can enter a word (or words) in response to the clue.

Figure 7:
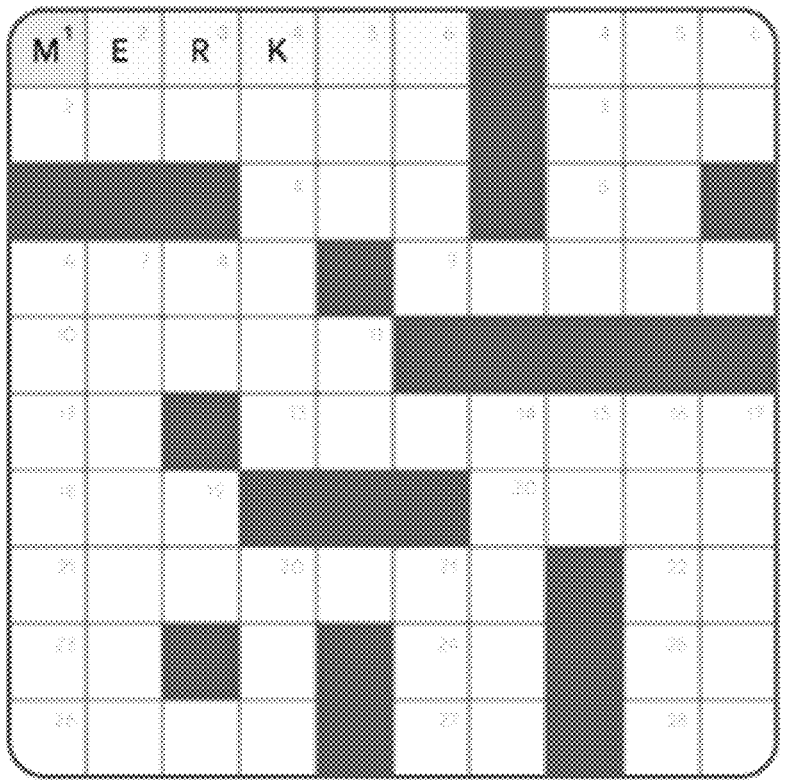
FIG. 7 is an example user interface in which a user is shown entering a word into the crossword puzzle in response to a clue.

FIG. 7 is an example user interface 700 in which a user is shown entering a word into the crossword puzzle in response to a clue. As shown in FIG. 7, the front-end server 110 presents a user interface that highlights the portion of the crossword puzzle corresponding to the shown clue. The interface 700 also presents a keyboard that the user can interact with to insert a word (or words) into the highlighted portion of the crossword puzzle. The interface 700 also includes arrow buttons adjacent to the clue that allow the user to toggle between the different clues. Each time the user toggles between clues, the portion of the crossword layout corresponding to the selected clue is highlighted.

In some implementations, the front-end server 110 also presents a hint to the user to assist the user in responding to the clue. As used in this specification, a hint is a resource that the user can select to access the news data item on which the clue-word pair is based or which is related to the clue-word pair. A hint can be selected or accessed using a link (associated with a portion of the clue) or other interactive graphical user interface (GUI) component, such as a button. Upon selecting or accessing the hint, the front end server 110 present the user with the resource, which can be a webpage or other web location, for the news data news on which the clue-word pair is based. For example, the hint can guide the user to an interface presenting the resource identified in the dictionary 218. In some implementations, accessing the hint directs the user to another interface where the user is presented with one or more links to data items that are related to clue-word pair (as described above). These resources provide information that is helpful in answering the clue.

Figure 8:
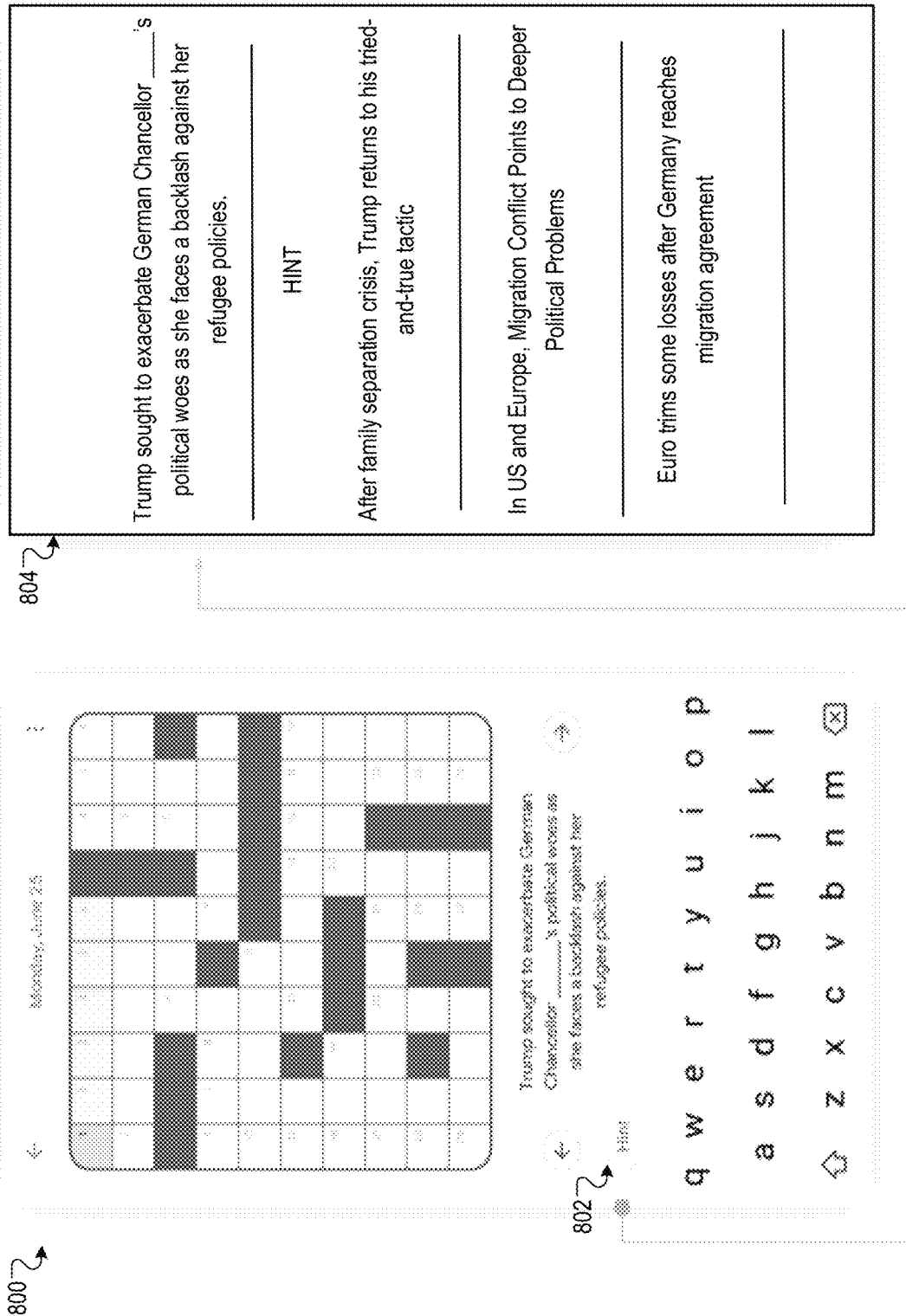
FIG. 8 depicts an example user interface in which the user is presented with a hint for a clue of the crossword puzzle.

FIG. 8 depicts an example interface 800 in which the user is presented with a hint for a clue of the crossword puzzle. The interface 800 includes a "hint" button 802 next to the clue that the user can select. Upon selecting this button, another interface 804 is launched, which includes the clue as well as links to data items (i.e., articles) from which the user can discern the answer to the clue.

Continuing with FIG. 3, the content platform 106 stores and provides the completion state of each puzzle accessed by the user (at 330). For each crossword puzzle that the user selects, e.g., from the interface shown in FIG. 5, the content platform 106 stores in a data storage device, all the text entered by the user in particular locations/portions of the puzzle. The content platform 106 also stores a completion state of the puzzle. In some implementations, the content platform 106 calculates the completion state percentage by counting all the words that the user has correctly entered in the crossword puzzle (e.g., by matching the entered words with the words among the clue-word pairs) and then dividing this by the total number of clues for the crossword puzzle.

The content platform 106 provides the calculated completion state for each puzzle to the user. As shown in FIG. 5, the content platform 106 includes text indicating the completion state of a puzzle (e.g., "25% complete," "33% complete," "Get Started," and "Complete").

Figure 9:
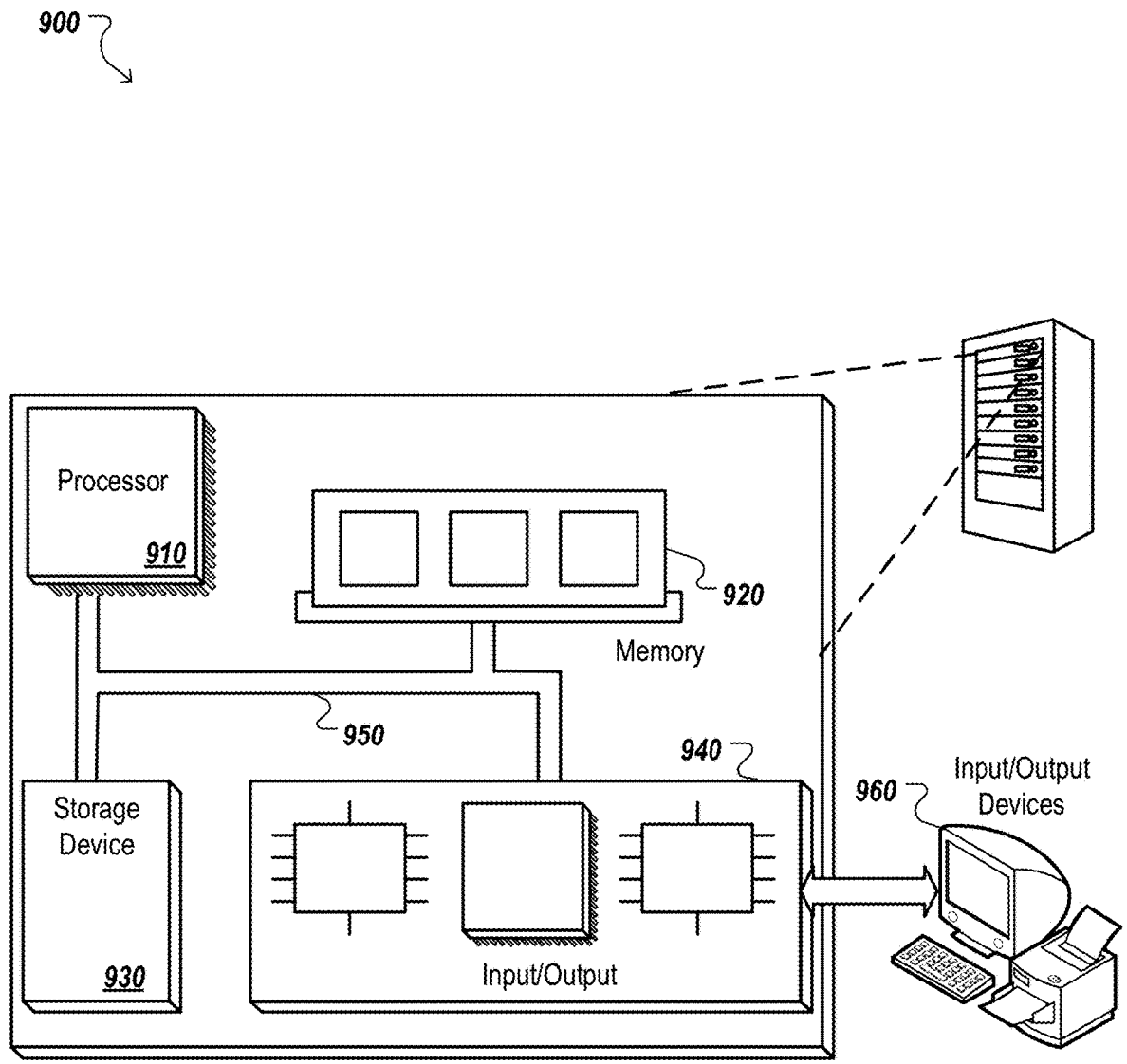
FIG. 9 is a block diagram of an example computer system.

FIG. 9 is a block diagram of an example computer system 900 that can be used to perform operations described above. The system 900 includes a processor 910, a memory 920, a storage device 930, and an input/output device 940. Each of the components 910, 920, 930, and 940 can be interconnected, for example, using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 can include, for example, a hard disk device, an optical disk device, a storage device that is shared over a network by multiple computing devices (e.g., a cloud storage device), or some other large capacity storage device.

The input/output device 940 provides input/output operations for the system 900. In one implementation, the input/output device 940 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 960. Other implementations, however, can also be used, such as mobile computing devices, mobile communication devices, set-top box television client devices, etc.

Although an example processing system has been described in FIG. 9, embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method, comprising:
   obtaining, by a data processing apparatus and from a content source, a plurality of data items;
   generating, by the data processing apparatus and using the plurality of data items, a dictionary comprising a plurality of clue-word pairs;
   generating a crossword layout using a random crossword layout generator;
   inputting the crossword layout into a model that outputs a likelihood that an input crossword layout results in a valid crossword, wherein the model is trained using a set of training data of historical crossword layouts that have resulted in valid and invalid crossword puzzles;
   in response to inputting the crossword layout into the model, obtaining, from the model, a likelihood that the crossword layout results in a valid crossword puzzle;
   determining that the likelihood that the crossword layout results in a valid crossword puzzle satisfies a first threshold;
   in response to determining that the likelihood satisfies the first threshold:
      inserting, into the crossword layout, a plurality of words in a set of clue-word pairs from among the plurality of clue-word pairs;
      determining that the plurality of words inserted into the crossword layout results in a valid crossword puzzle; and
   providing the crossword puzzle using the set of clue-word pairs to a user on a user device.

2. The computer implemented method of claim 1, wherein:
   the plurality of data items is a plurality of news data items, wherein each news data item in the plurality of news data items relates to a news event.

3. The computer implemented method of claim 2, further comprising:
  generating, by the data processing apparatus, an interest profile based on a threshold number of users with an interest in a category of news events; and
  wherein providing the crossword puzzle using the set of clue-word pairs to a user on a user device, includes providing the crossword puzzle to a user with a user profile that matches the interest profile.

4. The computer implemented method of claim 3, further comprising:
  assigning a score to each clue-word pair in the dictionary based on the interest profile;
  determining a total score for the crossword puzzle based on the score assigned based on the interest profile to each clue-word pair in the set of clue-word pairs; and
  wherein providing the crossword puzzle using the set of clue-word pairs to a user on a user device, further includes providing the crossword puzzle to a user only if the total score satisfies a second threshold.

5. The computer implemented method of claim 3, wherein the user profile is based on categories of news data items that the user has accessed.

6. The computer implemented method of claim 2, wherein providing the crossword puzzle using the set of clue-word pairs to a user on a user device, further comprises:
  providing a hint to the user for each clue-word pair used in the crossword puzzle, wherein the hint is a resource that the user can select to access the news data item on which the clue-word pair is based.

7. The computer implemented method of claim 1, further comprising:
  providing the user an interface where the user can select a crossword puzzle from among one or more crossword puzzles.

8. The computer implemented method of claim 7, further comprising:
  storing a completion state for each of the one or more crossword puzzles; and
  providing, on the interface, the completion state for each of the one or more crossword puzzles.

9. The computer implemented method of claim 8, further comprising:
  receiving a user's selection of a crossword puzzle from among the one or more crossword puzzles; and
  providing the selected crossword puzzle to the user using the stored completion state for the crossword puzzle.

10. A system, comprising:
  one or more memory devices storing instructions; and
  one or more data processing apparatus that are configured to interact with the one or more memory devices, and upon execution of the instructions, perform operations including:
    obtaining, from a content source, a plurality of data items;
    generating, using the plurality of data items, a dictionary comprising a plurality of clue-word pairs;
    generating a crossword layout using a random crossword layout generator;
    inputting the crossword layout into a model that outputs a likelihood that an input crossword layout results in a valid crossword, wherein the model is trained using a set of training data of historical crossword layouts that have resulted in valid and invalid crossword puzzles;
    in response to inputting the crossword layout into the model, obtaining, from the model, a likelihood that the crossword layout results in a valid crossword puzzle;
    determining that the likelihood that the crossword layout results in a valid crossword puzzle satisfies a first threshold;
    in response to determining that the likelihood satisfies the first threshold:
      inserting, into the crossword layout, a plurality of words in a set of clue-word pairs from among the plurality of clue-word pairs;
      determining that the plurality of words inserted into the crossword layout results in a valid crossword puzzle; and
      providing the crossword puzzle using the set of clue-word pairs to a user on a user device.

11. The system of claim 10, wherein:
  the plurality of data items is a plurality of news data items, wherein each news data item in the plurality of news data items relates to a news event.

12. The system of claim 11, wherein the one or more data processing apparatus are configured to perform operations further comprising:
  generating an interest profile based on a threshold number of users with an interest in a category of news events; and
  wherein providing the crossword puzzle using the set of clue-word pairs to a user on a user device, includes providing the crossword puzzle to a user with a user profile that matches the interest profile.

13. The system of claim 12, wherein the one or more data processing apparatus are configured to perform operations further comprising:
  assigning a score to each clue-word pair in the dictionary based on the interest profile;
  determining a total score for the crossword puzzle based on the score assigned based on the interest profile to each clue-word pair in the set of clue-word pairs; and
  wherein providing the crossword puzzle using the set of clue-word pairs to a user on a user device, further includes providing the crossword puzzle to a user only if the total score satisfies a second threshold.

14. The system of claim 12, wherein the user profile is based on categories of news data items that the user has accessed.

15. The system of claim 11, wherein providing the crossword puzzle using the set of clue-word pairs to a user on a user device, further comprises:
  providing a hint to the user for each clue-word pair used in the crossword puzzle, wherein the hint is a resource that the user can select to access the news data item on which the clue-word pair is based.

16. The system of claim 10, wherein providing the crossword puzzle using the set of clue-word pairs to a user on a user device, further comprises:
  providing the user an interface where the user can select a crossword puzzle from among one or more crossword puzzles.

17. The system of claim 16, wherein the one or more data processing apparatus are configured to perform operations further comprising:
  storing a completion state for each of the one or more crossword puzzles; and
  providing, on the interface, the completion state for each of the one or more crossword puzzles.

18. The system of claim 17, wherein the one or more data processing apparatus are configured to perform operations further comprising:

receiving a user's selection of a crossword puzzle from among the one or more crossword puzzles; and providing the selected crossword puzzle to the user using the stored completion state for the crossword puzzle.

19. A non-transitory computer readable medium storing instructions that, when executed by one or more data processing apparatus, cause the one or more data processing apparatus to perform operations comprising:

obtaining, from a content source, a plurality of data items;

generating, using the plurality of data items, a dictionary comprising a plurality of clue-word pairs;

generating a crossword layout using a random crossword layout generator;

inputting the crossword layout into a model that outputs a likelihood that an input crossword layout results in a valid crossword, wherein the model is trained using a set of training data of historical crossword layouts that have resulted in valid and invalid crossword puzzles;

in response to inputting the crossword layout into the model, obtaining, from the model, a likelihood that the crossword layout results in a valid crossword puzzle;

determining that the likelihood that the crossword layout results in a valid crossword puzzle satisfies a first threshold;

in response to determining that the likelihood satisfies the first threshold:

inserting, into the crossword layout, a plurality of words in a set of clue-word pairs from among the plurality of clue-word pairs;

determining that the plurality of words inserted into the crossword layout results in a valid crossword puzzle; and providing the crossword puzzle using the set of clue-word pairs to a user on a user device.

20. The non-transitory computer readable medium of claim 19, wherein:

the plurality of data items is a plurality of news data items, wherein each news data item in the plurality of news data items relates to a news event.

21. The non-transitory computer readable medium of claim 20, wherein the instructions cause the one or more data processing apparatus to perform operations comprising:

generating an interest profile based on a threshold number of users with an interest in a category of news events; and wherein providing the crossword puzzle using the set of clue-word pairs to a user on a user device, includes providing the crossword puzzle to a user with a user profile that matches the interest profile.

22. The non-transitory computer readable medium of claim 21, wherein the instructions cause the one or more data processing apparatus to perform operations comprising:

assigning a score to each clue-word pair in the dictionary based on the interest profile;

determining a total score for the crossword puzzle based on the score assigned based on the interest profile to each clue-word pair in the set of clue-word pairs; and wherein providing the crossword puzzle using the set of clue-word pairs to a user on a user device, further includes providing the crossword puzzle to a user only if the total score satisfies a second threshold.

23. The non-transitory computer readable medium of claim 21, wherein the user profile is based on categories of news data items that the user has accessed.

24. The non-transitory computer readable medium of claim 20, wherein providing the crossword puzzle using the set of clue-word pairs to a user on a user device, further comprises:

providing a hint to the user for each clue-word pair used in the crossword puzzle, wherein the hint is a resource that the user can select to access the news data item on which the clue-word pair is based.

25. The non-transitory computer readable medium of claim 19, wherein the instructions cause the one or more data processing apparatus to perform operations comprising:

providing the user an interface where the user can select a crossword puzzle from among one or more crossword puzzles.

26. The non-transitory computer readable medium of claim 25, wherein the instructions cause the one or more data processing apparatus to perform operations comprising:

storing a completion state for each of the one or more crossword puzzles; and providing, on the interface, the completion state for each of the one or more crossword puzzles.

27. The non-transitory computer readable medium of claim 26, wherein the instructions cause the one or more data processing apparatus to perform operations comprising:

receiving a user's selection of a crossword puzzle from among the one or more crossword puzzles; and providing the selected crossword puzzle to the user using the stored completion state for the crossword puzzle.

* * * * *